US011052353B2

(12) United States Patent
Lu et al.

(10) Patent No.: US 11,052,353 B2
(45) Date of Patent: Jul. 6, 2021

(54) CATALYST-CONTAINING OXYGEN TRANSPORT MEMBRANE

(71) Applicant: PRAXAIR TECHNOLOGY, INC., Danbury, CT (US)

(72) Inventors: Zigui Lu, East Amherst, NY (US); Yunxiang Lu, Williamsville, NY (US); Gervase Maxwell Christie, Amherst, NY (US); Jonathan A. Lane, Snyder, NY (US); Pawel J. Plonczak, Amherst, NY (US); Joseph M. Corpus, Avon, IN (US)

(73) Assignee: Praxair Technology, Inc., Danbury, CT (US)

( * ) Notice: Subject to any disclaimer, the term of this patent is extended or adjusted under 35 U.S.C. 154(b) by 97 days.

(21) Appl. No.: 16/085,786

(22) PCT Filed: Mar. 2, 2017

(86) PCT No.: PCT/US2017/020408
§ 371 (c)(1),
(2) Date: Sep. 17, 2018

(87) PCT Pub. No.: WO2017/172238
PCT Pub. Date: Oct. 5, 2017

(65) Prior Publication Data
US 2019/0022596 A1 Jan. 24, 2019

Related U.S. Application Data

(60) Provisional application No. 62/316,694, filed on Apr. 1, 2016.

(51) Int. Cl.
*B01D 67/00* (2006.01)
*B01D 69/10* (2006.01)
(Continued)

(52) U.S. Cl.
CPC ......... *B01D 67/0041* (2013.01); *B01D 69/10* (2013.01); *B01D 69/12* (2013.01);
(Continued)

(58) Field of Classification Search
CPC .... B01D 67/0041; B01D 69/10; B01D 69/12; B01D 71/024; B01J 23/002; B01J 23/46;
(Continued)

(56) References Cited

U.S. PATENT DOCUMENTS 2,593,507 A   4/1952   Wainer
2,692,760 A   10/1954  Flurschutz
(Continued)

FOREIGN PATENT DOCUMENTS

DE   10330859 A1   2/2004
DE   102004038435 A1   2/2006
(Continued)

OTHER PUBLICATIONS

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.
(Continued)

*Primary Examiner* — James A Fiorito
(74) *Attorney, Agent, or Firm* — Ralph J. Mancini

(57) ABSTRACT

A method is described of producing a catalyst-containing composite oxygen ion membrane and a catalyst-containing composite oxygen ion membrane in which a porous fuel oxidation layer and a dense separation layer and optionally, a porous surface exchange layer are formed on a porous support from mixtures of $(Ln_{1-x}A_x)_w Cr_{1-y}B_y O_{3-\delta}$ and a doped zirconia. Adding certain catalyst metals into the fuel oxidation layer not only enhances the initial oxygen flux, but also reduces the degradation rate of the oxygen flux over long-term operation. One of the possible reasons for the improved flux and stability is that the addition of the catalyst metal reduces the chemical reaction between the $(Ln_{1-x}A_x)_w$
(Continued)

$Cr_{1-y}B_yO_{3-\delta}$ and the zirconia phases during membrane fabrication and operation, as indicated by the X-ray diffraction results.

18 Claims, 3 Drawing Sheets

(51) Int. Cl.
| | |
|---|---|
| B01D 69/12 | (2006.01) |
| C01B 13/02 | (2006.01) |
| B01J 37/02 | (2006.01) |
| B01J 23/46 | (2006.01) |
| B01D 71/02 | (2006.01) |
| B01J 35/06 | (2006.01) |
| B01J 23/00 | (2006.01) |
| B01J 37/00 | (2006.01) |
| B01J 23/86 | (2006.01) |
| C04B 35/44 | (2006.01) |
| C04B 35/462 | (2006.01) |
| B32B 18/00 | (2006.01) |
| C04B 38/00 | (2006.01) |
| C04B 35/01 | (2006.01) |
| C04B 35/26 | (2006.01) |
| B01J 35/10 | (2006.01) |
| B01J 35/02 | (2006.01) |
| B01J 35/00 | (2006.01) |
| C04B 111/00 | (2006.01) |

(52) U.S. Cl.
CPC .......... *B01D 71/024* (2013.01); *B01J 23/002* (2013.01); *B01J 23/46* (2013.01); *B01J 23/462* (2013.01); *B01J 23/86* (2013.01); *B01J 23/862* (2013.01); *B01J 35/002* (2013.01); *B01J 35/023* (2013.01); *B01J 35/065* (2013.01); *B01J 35/1076* (2013.01); *B01J 37/0018* (2013.01); *B01J 37/0244* (2013.01); *B01J 37/0248* (2013.01); *B32B 18/00* (2013.01); *C01B 13/0255* (2013.01); *C04B 35/01* (2013.01); *C04B 35/016* (2013.01); *C04B 35/2641* (2013.01); *C04B 35/44* (2013.01); *C04B 35/462* (2013.01); *C04B 38/00* (2013.01); *B01D 2257/104* (2013.01); *B01D 2323/12* (2013.01); *B01D 2323/18* (2013.01); *B01D 2325/02* (2013.01); *B01J 2523/23* (2013.01); *B01J 2523/24* (2013.01); *B01J 2523/31* (2013.01); *B01J 2523/37* (2013.01); *B01J 2523/47* (2013.01); *B01J 2523/67* (2013.01); *B01J 2523/72* (2013.01); *B01J 2523/821* (2013.01); *B01J 2523/822* (2013.01); *B01J 2523/824* (2013.01); *B01J 2523/828* (2013.01); *B01J 2523/842* (2013.01); *B01J 2523/845* (2013.01); *B01J 2523/847* (2013.01); *C04B 2111/0081* (2013.01); *C04B 2111/00801* (2013.01); *C04B 2235/3208* (2013.01); *C04B 2235/3213* (2013.01); *C04B 2235/3224* (2013.01); *C04B 2235/3225* (2013.01); *C04B 2235/3227* (2013.01); *C04B 2235/3229* (2013.01); *C04B 2235/3241* (2013.01); *C04B 2235/3246* (2013.01); *C04B 2235/3274* (2013.01); *C04B 2235/3275* (2013.01); *C04B 2235/3279* (2013.01); *C04B 2235/3289* (2013.01); *C04B 2235/442* (2013.01); *C04B 2235/443* (2013.01); *C04B 2235/5445* (2013.01); *C04B 2235/658* (2013.01); *C04B 2235/6583* (2013.01); *C04B 2235/768* (2013.01); *C04B 2235/80* (2013.01); *C04B 2237/34* (2013.01); *C04B 2237/343* (2013.01); *C04B 2237/348* (2013.01); *C04B 2237/58* (2013.01); *C04B 2237/765* (2013.01)

(58) Field of Classification Search
CPC ........ B01J 23/462; B01J 23/86; B01J 23/862; B01J 35/002; B01J 35/023; B01J 35/0654; B01J 35/1076; B01J 37/0018; B01J 37/0244; B01J 37/0248; B32B 18/00; C01B 13/0255; C04B 35/01; C04B 35/016; C04B 35/2641; C04B 35/44; C04B 35/462; C04B 38/00
See application file for complete search history.

(56) References Cited

U.S. PATENT DOCUMENTS

| | | |
|---|---|---|
| 3,282,803 A | 11/1966 | Poepel et al. |
| 3,317,298 A | 5/1967 | Klomp et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Boquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |

(56) References Cited

U.S. PATENT DOCUMENTS

| | | |
|---|---|---|
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A | 1/2000 | Keskar et al. |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A | 8/2000 | Nataraj et al. |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Abbott |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Duna et al. |
| 7,279,244 B2 | 10/2007 | Morishima et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,704,070 B2 | 4/2010 | Veenstra |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Repasky et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,722,010 B1 | 5/2014 | Grover |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,422 B2 | 6/2016 | Chakravarti et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 9,556,027 B2 | 1/2017 | Chakravarti et al. |
| 9,611,144 B2 | 4/2017 | Chakravarti et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |

(56) References Cited

U.S. PATENT DOCUMENTS

| | | |
|---|---|---|
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0070509 A1 | 3/2011 | Mai |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0209618 A1 | 9/2011 | Takahashi |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1 | 3/2012 | Sane et al. |
| 2012/0194783 A1 | 11/2012 | Palamara et al. |
| 2012/0288439 A1 | 11/2012 | Sundaram et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0156978 A1 | 6/2013 | Christie et al. |
| 2013/0258000 A1 | 10/2013 | Ohashi et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner |
| 2014/0231351 A1 | 8/2014 | Wickramasinghe et al. |
| 2014/0319424 A1 | 10/2014 | Chakravarti et al. |
| 2014/0319425 A1 | 10/2014 | Chakravarti et al. |
| 2014/0319426 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |
| 2014/0323599 A1 | 10/2014 | Chakravarti et al. |
| 2015/0096506 A1 | 4/2015 | Kelly et al. |
| 2015/0098872 A1 | 4/2015 | Kelly et al. |
| 2015/0132485 A1 | 5/2015 | Garing et al. |
| 2015/0226118 A1 | 8/2015 | Kelly et al. |
| 2015/0328582 A1 | 11/2015 | Joo et al. |
| 2016/0001221 A1 | 1/2016 | Lu et al. |
| 2016/0118188 A1 | 4/2016 | Wada |
| 2016/0155570 A1 | 6/2016 | Shimada et al. |

FOREIGN PATENT DOCUMENTS

| | | |
|---|---|---|
| EP | 0 663 231 A2 | 7/1995 |
| EP | 0926096 A1 | 6/1999 |
| EP | 0984500 A2 | 3/2000 |
| EP | 0989093 A2 | 3/2000 |
| EP | 1 459 800 A2 | 9/2004 |
| EP | 1504811 A1 | 2/2005 |
| EP | 1717420 A1 | 11/2006 |
| EP | 1743694 A1 | 1/2007 |
| EP | 1930076 A1 | 6/2008 |
| EP | 2098491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1348375 | 3/1974 |
| GB | 2016298 A | 9/1979 |
| JP | 56-136605 | 10/1981 |
| WO | WO 97/41060 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007/060141 | 5/2007 |
| WO | WO 2007/086949 | 8/2007 |
| WO | WO 2007/092844 A2 | 8/2007 |
| WO | WO 2008/024405 | 2/2008 |
| WO | WO 2009/027099 A1 | 3/2009 |
| WO | WO 2010/052641 A2 | 5/2010 |
| WO | WO 2011/020192 A1 | 2/2011 |
| WO | WO 2011/083333 A1 | 7/2011 |
| WO | WO 2011/121095 A2 | 10/2011 |
| WO | WO 2012/067505 A2 | 5/2012 |
| WO | WO 2012/118730 | 9/2012 |
| WO | WO 2013/009560 A1 | 1/2013 |
| WO | WO 2013/062413 A1 | 5/2013 |
| WO | WO 2013/089895 A1 | 6/2013 |
| WO | WO 2014/049119 A1 | 4/2014 |
| WO | WO 2014/074559 A1 | 5/2014 |
| WO | WO 2014/077531 A1 | 5/2014 |
| WO | WO 2014/107707 A2 | 7/2014 |
| WO | WO 2014/160948 A1 | 10/2014 |
| WO | WO 2014/176022 A1 | 10/2014 |

OTHER PUBLICATIONS

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

(56) References Cited

OTHER PUBLICATIONS

Zhu et al.; "Development of Interconnect Materials for Solid Oxide Fuel Cells"; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

The U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2 , Energy Conyers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

M. Solvang et al., "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf (retrieved on Mar. 8, 2017).

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf. retrieved on Mar. 9, 2017.

Yulia Hilli, et al.; "Sulfur adsorption and release properties of bimetallic Pd-Ni supported catalysts"; Journal of Molecular Catalysis A: Chemical, vol. 48, Jul. 28, 2015, pp. 161-171, XP029261263.

Magali Ferrandon, et al.; "Bimetallic Ni-Rh catalysts with low amounts of Rh for the steam and autothermal reforming of η-butane for fuel cell applications"; Applied Catalysis A: General, Elsevier, Amsterdam, NL, vol. 379, No. 1-2, 15 May 2010, pp. 121-128, XP027013168.

M. Boaro, et al.; "Comparison between Ni-Rh/gadolinia doped ceria catalysts in reforming of propane for anode implementations in intermediate solid oxide fuel cells"; Journal of Power Sources, Elsevier SA, CH, vol. 195, No. 2, Jan. 15, 2010, pp. 649-661, XP026640152.

CATALYST-CONTAINING OXYGEN TRANSPORT MEMBRANE

RELATED APPLICATIONS

This application claims the benefit of International Application No. PCT/US2017/020408, filed on Mar. 2, 2017, which claimed the benefit of U.S. Provisional Application Ser. No. 62/316,694, filed on Apr. 1, 2016, which are incorporated herein by reference.

GOVERNMENT SUPPORT

This invention was made with Government support under Cooperative Agreement No. DE-FC26-07NT43088, awarded by the United States Department of Energy. The Government has certain rights in this invention.

FIELD OF THE INVENTION

The present invention relates to a composite oxygen transport membrane and the method of forming such membranes in which catalyst particles, selected to enhance the oxygen flux and oxygen flux stability over long-term operation, are located in the porous fuel oxidation layer, which in turn is located between the porous support layer and the dense separation layer.

BACKGROUND OF THE INVENTION

Oxygen transport membranes function by transporting oxygen ions through a material that is capable of conducting oxygen ions and electrons at elevated temperatures. When an oxygen partial pressure difference exists between opposite sides of such a membrane, oxygen molecules will be reduced to oxygen ions on one surface of the membrane, transport through the dense membrane, and emerge on the opposite side of the membrane and recombine into elemental oxygen and release electrons. The free electrons resulting from the combination will be transported back through the membrane to ionize the oxygen. The oxygen partial pressure difference can be produced by providing the oxygen containing feed to the membrane at an elevated pressure or by providing a combustible fuel or other reducing species in the presence of the separated oxygen on the opposite side of the membrane or a combination of the two methods. It is to be noted that the combustion will produce heat that is used to raise the temperature of the membrane to an operational temperature at which the oxygen ion transport can occur and also, to supply heat to an industrial process that requires heating. Moreover, whether or not heat is required for a process, the combustion itself can produce products such as synthesis gases by means of partial oxidation of a fuel or other combustible substance occasioned as a result of the combustion.

Oxygen transport membranes can utilize a single phase mixed conducting material such as a perovskite to conduct the electrons and transport the oxygen ions. While perovskite materials with mixed electronic and ionic conductivity, such as $La_{1-x}Sr_xCo_{1-y}Fe_yO_{3-\delta}$ or $Ba_{1-x}Sr_xCo_{1-y}Fe_yO_{3-\delta}$, can exhibit a significant oxygen flux, such materials tend to be very fragile under operating conditions where a fuel or other combustible substance is used to provide the partial pressure difference. This is because the perovskite exhibits a variable stoichiometry with respect to oxygen chemical potential or decompose in reducing atmosphere, which makes the material unsuitable for processes in which a reducing species is introduced. In order to overcome this problem, a two-phase mixture of more stable materials can be used in which a primarily ionic conductor is provided to conduct the oxygen ions and a primarily electronic conductor is used to conduct the electrons. The primarily ionic conductor can be a fluorite structured oxide such as a stabilized zirconia and the primarily electronic conductor can be a perovskite structured oxide which contains Cr and is therefore more stable than Co-containing mixed conducting materials.

Typically, when oxygen transport membranes are composed of mixtures of two separate phases, due to the relatively low ambipolar conductivity of the composite materials, the membrane needs to be made thin to minimize the oxygen chemical potential difference required to provide an oxygen flux and therefore needs to be supported on a porous substrate. The supported thin film usually includes a dense separation layer, a porous fuel oxidation layer located between the dense separation layer and the porous support layer and a porous surface activation layer located opposite to the porous fuel oxidation layer and on the other side of the dense separation layer. All of these layers are supported on a porous support, or porous supporting substrate. Oxygen ion transport occurs principally in the dense separation layer. Although defects can exist in the dense separation layer that enable the passage of gas through such layer, it is intended to be gas tight and therefore, not porous. Both the porous surface activation layer and the porous fuel oxidation layers are "active", that is, they are formed from materials that permit the transport of oxygen ions and the conduction of electrons. The porous fuel oxidation layer enhances the rate of fuel oxidation by providing a high surface area where fuel can react with oxygen ions. The oxygen ions diffuse through the mixed conducting matrix of this porous layer towards the porous support and react with the fuel that diffuses inward from the porous support into the porous fuel oxidation layer. The porous surface activation layer enhances the rate of oxygen incorporation by enhancing the surface area of the dense separation layer while providing a path for the resulting oxygen ions to diffuse through the oxygen ion conducting phase to the dense separation layer and for oxygen molecules to diffuse through the open pore space to the dense separation layer. The surface activation layer therefore, reduces the loss of driving force in the oxygen incorporation process and thereby increases the achievable oxygen flux. Preferably, the porous fuel oxidation layer and the porous surface exchange layer are formed from similar electronic and ionic phases as the dense separation layer to provide a close match in thermal expansion between the layers.

U.S. Pat. No. 7,556,676 describes a composite oxygen ion transport membrane. In order to form a dense, gas impermeable dual phase membrane layer from these materials the membrane needs to contain vanadium, and be sintered in a furnace atmosphere containing a mixture of hydrogen and nitrogen. From a cost perspective for high volume manufacturing it would be preferable to sinter in an atmosphere which does not contain hydrogen. From an environmental viewpoint it would be beneficial to eliminate vanadium. The materials of both the porous intermediate fuel oxidation layer and the porous air side surface exchange layers described in this patent have shown a tendency to densify during prolonged usage at high temperatures. Densification of these layers results in degradation of oxygen flux through the membrane due to loss of surface area and therefore active reaction site.

U.S. Pat. No. 8,795,417 B2 and its continuation-in-part application, U.S. application Ser. No. 14/322,981, provide a method of producing a composite oxygen ion membrane consisting of a porous fuel oxidation layer and a dense separation layer and optionally, a porous surface exchange layer from mixtures of $(Ln_{1-x}A_x)_wCr_{1-y}B_yO_{3-\delta}$ and a doped zirconia, where Ln is La, Y, Pr, Ce or Sm, A is Ca or Sr, B is Fe, Mn, Co, Al, Ti or combinations thereof, w is from about 0.9 to about 1.0, x is from about 0.1 to about 0.3 and y is from about 0.1 to about 0.6. The typical materials are $(La_{0.8}Sr_{0.2})_{0.95}Cr_{0.7}Fe_{0.3}O_{3-\delta}$ (LSCrF73) for the porous fuel oxidation layer, $(La_{0.8}Sr_{0.2})_{0.95}Cr_{0.5}Fe_{0.5}O_{3-\delta}$ (LSCrF55) for the dense separation layer, and $(La_{0.8}Sr_{0.2})_{0.95}Cr_{0.3}Fe_{0.7}O_{3-\delta}$ (LSCrF37) for the optional porous surface exchange layer. The membrane is sintered to full density in a nitrogen atmosphere without the need of a sintering aid or hydrogen in the sintering atmosphere. Sintering in a non-hydrogen atmosphere not only reduces the manufacturing cost, but also eliminates the formation of insulating phases between the perovskite and zirconia materials otherwise formed when a hydrogen-containing atmosphere is used. Formation of such insulating phases reduces the achievable oxygen flux.

Oxygen membranes fabricated in such approach exhibit a high initial oxygen flux. However, the oxygen flux decreases rapidly over the first few hours of operation. The reason for the initial degradation of flux is unclear. X-ray diffraction results for a powder mixture of LSCrF55 and doped zirconia after exposure to fuel atmosphere at operating temperatures indicate that an new insulating phase, lanthanum zirconate $(La_2Zr_2O_7)$, is formed, which might contribute to the degradation of flux. Moreover, when the oxygen membrane is used as a secondary reformer to produce synthesis gas, in addition to its oxygen transport capability, it is desirable that the oxygen membrane should also have some catalytic activity for methane reforming to convert the remaining methane to synthesis gas.

As will be discussed, the present invention provides a method of manufacturing a catalyst-containing composite oxygen ion transport membrane which exhibits higher initial oxygen flux and lower degradation rate over long time operation.

SUMMARY OF THE INVENTION

The present invention provides a method of manufacturing a catalyst containing oxygen ion composite membrane. In accordance with such method, a first layer containing a first mixture of particles of $(Ln_{1-x}A_x)_wCr_{1-y}B_yO_{3-\delta}$, doped zirconia, an optional metal M, and pore formers is formed on a porous support. Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.6, M is Ru, Rh, Pd, Pt, Co, or Ni or combinations thereof. The first mixture contains the $(Ln_{1-x}A_x)_wCr_{1-y}B_yO_{3-\delta}$, the doped zirconia, and the optional metal M such that when sintered, the first layer will contain from about 20 vol. % to about 70 vol. % of the $(Ln_{1-x}A_x)_wCr_{1-y}B_yO_{3-\delta}$, from about 30 vol. % to about 80 vol. % of the doped zirconia, and optionally from about 0.1 vol. % to about 20 vol. % of the metal M, all based on the volume percentage of the total solid mass. A second layer is formed on the first layer that contains a second mixture of particles of $(Ln_{1-x}A_x)_wCr_{1-y}B_yO_{3-\delta}$ and the doped zirconia. In one embodiment this second mixture of particles is substantially free of pore formers. In another embodiment, the second mixture of particles does not contain pore formers. In such mixture, Ln is La, Y, Pr, Ce or Sm, A is Ca or Sr, and B is Fe, Mn, Co, Ni, Al, Ti or combinations thereof, w is from about 0.9 to about 1.0, x is from about 0.1 to about 0.3 and y is from about 0.1 to about 0.7. The second mixture contains the $(Ln_{1-x}A_x)_wCr_{1-y}B_yO_{3-\delta}$ and the doped zirconia such that when sintered, the second layer will contain the $(Ln_{1-x}A_x)_wCr_{1-y}B_yO_{3-\delta}$ and the doped zirconia in a volume percentage of $(Ln_{1-x}A_x)_wCr_{1-y}B_yO_{3-\delta}$ of from about 20 vol. % to about 70 vol. % of the total solid mass. The first layer and the second layer and porous support are heated so that said first layer partially sinters into a porous mass containing the first mixture of particles, thereby to provide a porous fuel oxidation layer and the second layer sinters fully into a densified mass containing the second mixture of particles, thereby to provide a dense separation layer. Said heating can be conducted in a nitrogen or predominantly nitrogen atmosphere, e.g., air (79% $N_2$/21% $O_2$) atmosphere or forming gas (95% $N_2$/5% $H_2$) atmosphere, or in any other inert atmosphere conventionally employed in heating and/or sintering steps, including but not limited to $CO_2$, argon, or mixtures thereof. While maintaining a fully densified separation layer, the porosity of the first layer can be controlled by adjusting either the amount of pore formers, the Cr content in the perovskite material, or optionally, the amount of metal M in the first layer.

In addition to the foregoing, a third layer can be formed on the second layer containing a third mixture of particles of $(Ln_{1-x}A_x)_wCr_{1-y}B_yO_{3-\delta}$ and the doped zirconia and pore formers. Again, for such mixture, Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7. The third mixture has a third volume percentage of the $(Ln_{1-x}A_x)_wCr_{1-y}B_yO_{3-\delta}$ and the doped zirconia such that, when sintered, the third layer will contain the $(Ln_{1-x}A_x)_wCr_{1-y}B_yO_{3-\delta}$ and the doped zirconia in a volume percentage of $(Ln_{1-x}A_x)_wCr_{1-y}B_yO_{3-\delta}$ from about 20 vol. % to about 70 vol. % of the total solid mass. The third layer is sintered in air at a temperature such that the third layer is porous. In one embodiment, the doped zirconia is 10 mol % scandia and 1 mol % yttria doped zirconia (10Sc1YSZ) or 10 mol % scandia and 1 mol % ceria doped zirconia (10Sc1CeSZ) or 10 mol % scandia and 1 mol % ceria and 1 mol % yttria doped zirconia (10Sc1Ce1YSZ).

The $(Ln_{1-x}A_x)_wCr_{1-y}B_yO_{3-\delta}$ within the first and second mixtures of particles can be $(La_{1-x}Sr_x)_wCr_{1-y}Fe_yO_{3-\delta}$, where w is 0.95, x is 0.2 and y is 0.3. The $(Ln_{1-x}A_x)_wCr_{1-y}B_yO_{3-\delta}$ within the third mixture of particles can be $(La_{1-x}Sr_x)_wCr_{1-y}Fe_yO_{3-\delta}$, where w is 0.95, x is 0.2 and y is 0.3.

In one embodiment, the first layer contains about 28-30 vol. % of $(La_{1-x}Sr_x)_wCr_{1-y}Fe_yO_{3-\delta}$, about 67-70 vol. % of the doped zirconia, and optionally about 5 vol. % of the metal M, the second layer contains about 30 vol. % of $(La_{1-x}Sr_x)_wCr_{1-y}Fe_yO_{3-\delta}$ and about 70 vol. % of the doped zirconia, and the third layer contains about 30 vol. % of $(La_{1-x}Sr_x)_wCr_{1-y}Fe_yO_{3-\delta}$ and about 70 vol. % of the doped zirconia, all in volume percentages of the total solid mass. The porous support can be of tubular or planar configuration. In one specific embodiment, the porous support is formed of 4 mol % Yttria Stabilized Zirconia (4YSZ) and fired at a temperature of about 1050° C., so that it is not fully sintered prior to forming the first layer on the porous support. Alternatively, the first, second and optional third layers can be formed on an unfired green porous support and the entire structure can be heated together. In such an embodiment, the first layer is formed on the porous support and dried at ambient temperature. The second layer is then formed on the first layer. The first layer, the second layer and the porous support are then sintered at a temperature of from about 1350° C. to about 1450° C. in a predominantly nitrogen atmosphere. Additionally, the third layer can be formed on the second layer and be sintered at a temperature of from about 1250° C. to about 1350° C. in air. Alternatively, the first layer, the second layer and the third layer can be sintered together at a temperature of from 1350° C. to about 1450° C. in a predominantly nitrogen atmosphere. In any embodiment of the present invention, the first layer, the second layer and/or the third layer can be formed by any conventional coating method. In one embodiment, the first layer, the second layer and/or the third layer are formed by slurry coating.

The present invention also provides an oxygen ion composite membrane that comprises first and second layers on a porous support providing a porous fuel oxidation layer and a dense separation layer, respectively. The first layer contains a first mixture of particles of $(Ln_{1-x}A_x)_wCr_{1-y}B_yO_{3-\delta}$, doped zirconia, a metal M, and pore formers formed on a porous support. Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7, M is Ru, Rh, Pd, Pt, Co, or Ni or combinations thereof. The second layer, which is formed on the first layer, contains a second mixture of particles of $(Ln_{1-x}A_x)_wCr_{1-y}B_yO_{3-\delta}$ and doped zirconia, where Ln is La, Y, Pr, Ce or Sm, A is Ca or Sr, and B is Fe, Mn, Co, Ni, Al, Ti or combinations thereof, w is from about 0.9 to about 1.0, x is from about 0.1 to about 0.3 and y is from about 0.1 to about 0.7. The first layer contains from about 20 vol. % to about 70 vol. % of the $(Ln_{1-x}A_x)_wCr_{1-y}B_yO_{3-\delta}$, from about 30 vol. % to about 80 vol. % of the doped zirconia, and optionally from about 0.1 vol. % to about 20 vol. % of the metal M, all in volume percentage of the total solid mass. The second layer contains from about 20 vol. % to about 70 vol. % of the $(Ln_{1-x}A_x)_wCr_{1-y}B_yO_{3-\delta}$ and from 30 vol. % to about 80 vol. % of the doped zirconia, all in volume percentage of the total solid mass.

A third layer can be situated on the second layer to form a porous surface exchange layer and that also contains the mixture of $(Ln_{1-x}A_x)_wCr_{1-y}B_yO_{3-\delta}$ and the doped zirconia. In such layer, Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7. The third layer contains the $(Ln_{1-x}A_x)_wCr_{1-y}B_yO_{3-\delta}$ and the doped zirconia in a volume percentage of $(Ln_{1-x}A_x)_wCr_{1-y}B_yO_{3-\delta}$ between about 20 vol. % and about 70 vol. % of the total solid mass.

Further, the doped zirconia can be 10Sc1YSZ or 10Sc1CeSZ or 10Sc1Ce1YSZ. Preferably, the $(Ln_{1-x}A_x)_wCr_{1-y}B_yO_{3-\delta}$ within the first and the second layers is $(La_{0.8}Sr_{0.2})_{0.95}Cr_{0.7}Fe_{0.3}O_{3-\delta}$; and the $(La_{1-x}A_x)_wCr_{1-y}B_yO_{3-\delta}$ within the third layer is preferably $(La_{0.8}Sr_{0.2})_{0.95}Cr_{0.7}Fe_{0.3}O_{3-\delta}$. Additionally, preferably, the first layer contains about 28-30 vol. % of $(Ln_{1-x}A_x)_wCr_{1-y}B_yO_{3-\delta}$, about 67-70 vol. % of doped zirconia, and optionally about 5 vol. % of metal M; the second layer contains about 30 vol. % of $(Ln_{1-x}A_x)_wCr_{1-y}B_yO_{3-\delta}$ and about 70 vol. % of doped zirconia; and the third layer contains about 30 vol. % of $(Ln_{1-x}A_x)_wCr_{1-y}B_yO_{3-\delta}$ and about 70 vol. % of doped zirconia. All of the aforementioned percentages are volume percentage of the total solid mass. In one non-limiting embodiment of the present invention, the porous support is of tubular configuration.

BRIEF DESCRIPTION OF THE DRAWINGS

While the specification concludes with claims distinctly pointing out the subject matter that the inventors regard as their invention, it is believed that the invention will be better understood when taking in connection with the accompanying drawings in which:

DETAILED DESCRIPTION

Figure 1:
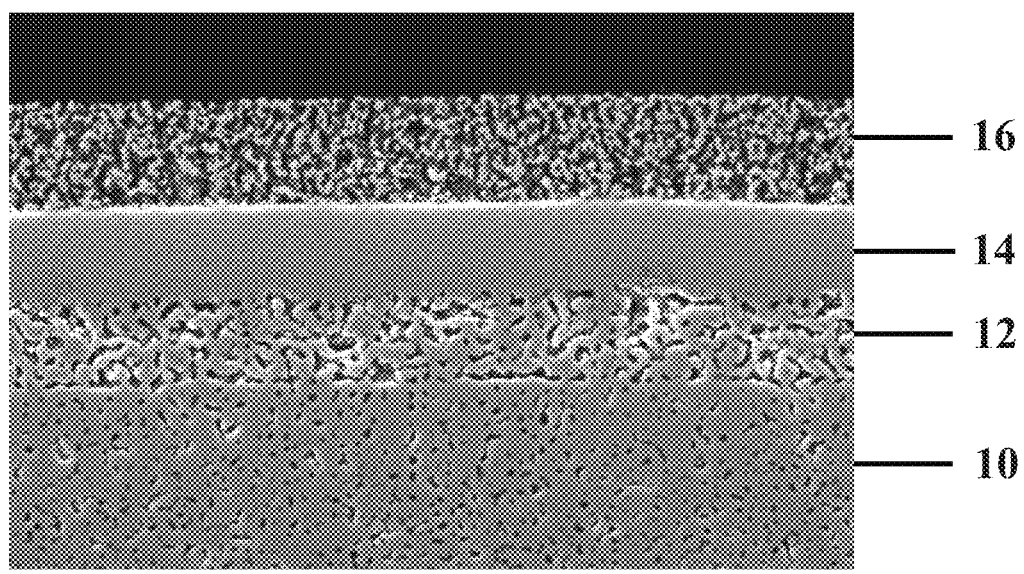
FIG. 1 is a cross-sectional SEM micrograph image of a composite oxygen ion transport membrane.

FIG. 1 illustrates a cross-sectional micrograph of a composite oxygen transport membrane 1 of the invention. Composite oxygen transport membrane 1 has a porous support layer 10. Applied to the porous support layer 10 is a first layer 12, a second layer 14 and a third layer 16. The composite oxygen transport membrane is specifically designed to function in an environment in which a fuel or other combustible substance is introduced to the porous support layer 10, on the side opposite to the first, second and third layer 12, 14 and 16, and subjected to combustion supported by permeated oxygen to both provide the partial pressure difference necessary to drive oxygen ion transport and also to heat the membrane to an operational temperature at which oxygen ion transport will occur. In this regard, the term "fuel" when used in connection with this layer, both herein and in the claims, is not intended to be limiting, but rather, to indicate and include any substance that can be oxidized through permeation of oxygen through the membrane. The second layer 14 is the active layer at which oxygen ion transport principally occurs and as such, serves as dense separation layer that is impervious to gas, but allows oxygen ion transport. The third layer 16 serves to initially reduce the oxygen and thus serves as a porous surface activation layer. Each of the first layer 12, the second layer 14 and the third layer 16 after heating and sintering will preferably each have a thickness of between about 10 micron and about 50 micron.

The porous support layer 10 could be formed preferably from partially stabilized zirconia oxide e.g. from about 3 to about 7 mol % yttria stabilized zirconia. Partially doped zirconia with yttria content lower than 4 mol % tends to experience a tetragonal-to-monoclinic phase transformation at ambient temperature, especially when under stress or in the presence of water vapor. The tetragonal-to-monoclinic phase transformation is accompanied by about 5% volume increase and results in cracking of the porous support or delamination of the coating layers from the porous support. Although not part of the present invention, as would be appreciated by those skilled in the art, porous support layer 10 should provide as open an area as possible while still being able to be structurally sound in its supporting function.

A stabilized zirconia, namely, $Zr_{1-x-y}A_xB_yO_{2-\delta}$ is a common material in all three "active" membrane layers, namely, the first layer 12, the second layer 14 and the third layer 16. As mentioned above in all of these layers oxygen ion transport occurs and as such, are "active". In order to generate industrially relevant levels of oxygen ion conductivity, A and B are typically Sc, Y, Ce, Al, Yb or Ca. Preferably, such stabilized zirconia has a composition given by the formula: $Zr_{0.802}Sc_{0.180}Y_{0.018}O_{2-\delta}$ or $Zr_{0.809}Sc_{0.182}Ce_{0.009}O_{2-\delta}$, often denoted as 10Sc1YSZ or 10Sc1CeSZ, respectively, in literature associated with this class of membrane. However it should be noted that many different combinations of Sc, Y, Ce, Al, Yb, Ca or other elements can be substituted to achieve the same end.

Turning first to the first layer 12, this layer is formed from a first mixture of particles of $(Ln_{1-x}A_x)_wCr_{1-y}B_yO_{3-\delta}$, 10Sc1YSZ, metal M, and pore formers. In this layer, Ln is La, Y, Pr, Ce or Sm, A is Ca or Sr, B can be Mn, Fe, Co, Ni, Al, Ti or combinations thereof, w is from about 0.9 to about 1.0, x is from about 0.1 to about 0.3 and y is from about 0.1 to about 0.6. The metal M can be added in the form of elemental state or compounds, including but not limited to oxides, carbonates or nitrates. The preferred composition of the perovskite material for this layer is $(La_{0.8}Sr_{0.2})_{0.95}Cr_{0.7}Fe_{0.3}O_{3-\delta}$. The first layer contains from about 20 vol. % to 70 vol. % of $(La_{1-x}A_x)_wCr_{1-y}B_yO_{3-\delta}$, from 30 vol. % to 80 vol. % of the doped zirconia, and optionally from 0.1 vol. % to 20 vol. % of the metal M, all in volume percentage of the total sintered mass. In one embodiment, the first layer contains 28-30 vol. % of $(La_{1-x}A_x)_wCr_{1-y}B_yO_{3-\delta}$, 67-70 vol. % of the doped zirconia, and optionally 5 vol. % of the metal M, all in volume percentage of the sintered mass. In another embodiment, the first layer contains 28-30 vol. % of $(La_{0.8}Sr_{0.2})_{0.95}Cr_{0.5}Fe_{0.5}O_{3-\delta}$, 67-70 vol. % of 10Sc1YSZ, and optionally 5 vol. % of Ru, all in volume percentage of the sintered mass.

The second layer 14 is formed of a second mixture of particles of $(Ln_{1-x}A_x)_wCr_{1-y}B_yO_{3-\delta}$ and the doped zirconia. The function of the second layer 14 is to be a gas separation layer that is impervious to gas molecules but should be conductive to oxygen ions and electrons. In this layer, Ln is La, Y, Pr, Ce or Sm, A is Ca or Sr, B is Mn, Fe, Co, Ni, Al, Ti or combinations thereof, x is from about 0.1 to about 0.3, y is from about 0.1 to about 0.7 and w is from about 0.9 to about 1.0. In one embodiment, the preferred compositions of material for this layer are $(La_{0.8}Sr_{0.2})_{0.95}Cr_{0.7}Fe_{0.3}O_{3-\delta}$ and 10Sc1YSZ. Within the second mixture of particles, the $(Ln_{1-x}A_x)_wCr_{1-y}B_yO_{3-\delta}$ and the doped zirconia should be present within a second volume percentage of $(Ln_{1-x}A_x)_wCr_{1-y}B_yO_{3-\delta}$ of from about 20 vol. % to about 70 vol. % of the total sintered mass. In one embodiment, the second volume percentage is about 30 vol. % of $(Ln_{1-x}A_x)_wCr_{1-y}B_yO_{3-\delta}$ and 70 vol. % of the doped zirconia.

The third layer 16, that serves as the porous surface exchange layer, is formed of a third mixture of particles of $(Ln_{1-x}A_x)_wCr_{1-y}B_yO_{3-\delta}$ and the doped zirconia. In this layer, Ln is La, Y, Pr, Ce or Sm, A is Ca or Sr, B can be Mn, Fe, Co, Ni, Al, Ti or combinations thereof; w is from about 0.9 to about 1.0, x is from about 0.1 to about 0.3 and y is from about 0.1 to about 0.7. In one embodiment, the compositions of material for this layer are $(La_{0.8}Sr_{0.2})_{0.95}Cr_{0.7}Fe_{0.3}O_{3-\delta}$ and 10Sc1YSZ. The $(Ln_{1-x}A_x)_wCr_{1-y}B_yO_{3-\delta}$ and the doped zirconia should be present within a third volume percentage of $(Ln_{1-x}A_x)_wCr_{1-y}B_yO_{3-\delta}$ of from about 20 vol. % to about 70 vol. % of the total sintered mass. In one embodiment, the third volume percentage of $(Ln_{1-x}A_x)_wCr_{1-y}B_yO_{3-\delta}$ is about 30 vol. %.

Example 1

In a first example of forming the composite oxygen ion transport membrane 1, the perovskite material $(La_{0.8}Sr_{0.2})_{0.95}Cr_{0.5}Fe_{0.5}O_{3-\delta}$ (LSCrF55) for the second layer 14, the gas separation layer, can be obtained from NexTech Materials, Ltd., Lewis Center, Ohio and $Zr_{0.802}Sc_{0.180}Y_{0.018}O_{2-\delta}$ (10Sc1YSZ) can be obtained from Daiichi Kigenso Kagaku Kogyo Co., Ltd, Osaka, Japan through their US agent Sojitz, Ltd, in New York, United States of America. The perovskite phase LSCrF55 can have a particle size $d_{50}$ in the range of from about 0.3 to about 0.5 micron, the 10Sc1YSZ should have a $d_{50}$ of less than 0.6 micron. In order to fabricate a 70 gram batch of gas separation layer slurry, 36.75 gram of LSCrF55 are mixed with 33.25 gram of 10Sc1YSZ, 36 gram Ferro B73210 binder, 170 gram toluene and 1200 gram of 1.5 millimeter diameter YSZ milling media in a 500 milliliter Teflon bottle. The mixture is milled until the particle size of the mixture is in the range of from about 0.3 to 0.5 micron. The perovskite material $(La_{0.8}Sr_{0.2})_{0.95}Cr_{0.5}Fe_{0.5}O_{3-\delta}$ (LSCrF55) for the first layer 12, the fuel oxidation layer, is also obtained from NexTech Materials, Ltd., Lewis Center, Ohio and the 10Sc1YSZ can also be obtained from Daiichi Kigenso Kagaku Kogyo Co. Ltd, Osaka, Japan through their US agent Sojitz, Ltd, in New York. Ru is added in the form of $RuO_2$ which is procured from Johnson Matthey, West Deptford, N.J. and has a particle size $d_{50}$ of 1.3 micron. The perovskite phase LSCrF55 is specified as having a particle size $d_{50}$ in the range of from about 0.3 to about 0.5 micron, the 10Sc1YSZ has a particle size $d_{50}$ of less than 0.6 μm as received. In order to prepare a 60 gram batch of fuel oxidation layer slurry, 30 gram of LSCrF55, 18.09 gram of 10Sc1YSZ, 2.91 gram of $RuO_2$, 100 gram of toluene, 20 gram of Ferro B73210 binder, and 500 gram of 1.5 millimeter diameter YSZ grinding media are added in a 250 milliliter Teflon bottle. The mixture is then milled for about 6 hours to form a slurry having a particle size $d_{50}$ of from about 0.3 to about 0.5 micron. About 9 gram of carbon black having a particle size of about $d_{50}$ of 0.8 micron and 1.2 gram of surfactant KD-1 are added to the slurry and milled for additional 2 hours. To prepare the surface exchange layer slurry, 80 gram of the electronic and ionic mixture having $(La_{0.8}Sr_{0.2})_{0.95}Cr_{0.3}Fe_{0.7}O_{3-\delta}$ (LSCrF37) and 10Sc1YSZ is prepared so that the mixture contains about 60% of LSCrF37 and about 40% of 10Sc1YSZ by volume. To the mixture, 28.8 gram of toluene, 19.2 gram of ethyl alcohol, 16 gram of the same Ferro binder mentioned above, 1.6 gram of surfactant KD-1, and about 500 gram of 1.5 millimeter diameter YSZ grinding media are added and the resultant mixture is milled for about 2 hours to form a slurry having a particle size $d_{50}$ of from about 0.3 to about 0.5 micron. About 12 gram of carbon black are added to the slurry and it is milled for additional 2 hours.

In order to form a composite oxygen transport membrane 1 from these slurries the slurries are deposited on a porous support 10 by slurry coating followed by firing in nitrogen. The porous support 10 can be tubular and fabricated by an extrusion process. Although the porous support 10 can be fully sintered, it can first be fired at a low temperature e.g. at about 1050° C. after green forming such that some residual shrinkage remains when the coated substrate is fired again at higher temperatures. The first layer 12 is then deposited on the surface of the porous support layer 10 and the proper thickness is controlled by the speed at which the supporting substrate is dipped into the slurry. The first layer 12 is allowed to dry at ambient temperature. The second layer 14 is then applied on top of the first layer 12 by dipping the component into the gas separation slurry and allowed to dry. The coating process is repeated two to three times to achieve the desirable thickness. The coated tube is slowly heated in flowing nitrogen to a temperature of from about 1350° C. to about 1450° C. and held at the same temperature for about 6 hours for the membrane to sinter completely. During sintering, the oxygen partial pressure of the atmosphere in the furnace is controlled below 20 Pa. The tube is then cooled in nitrogen to complete the sintering process. The sintered tube is checked for flow coefficient, Cv, as defined below:

$$Cv = \frac{q}{0.471 N_2 p_1 \sqrt{\frac{1}{G_g T_1}}}$$

where q is the flow rate, $N_2$ is a constant, $p_1$ is the inlet pressure, $G_g$ is the gas specific gravity, and $T_1$ is the absolute upstream temperature. The Cv of a sintered 2-foot long tube should not exceed $1.5 \times 10^{-5}$. After densification of the separation layer 14, the third layer 16 is applied by slurry coating the sintered three layer membrane structure and firing at a temperature of from 1250° C. to about 1350° C. in air. The third layer 16 could also be applied after drying of the dense layer, 14 and then all three active layers 12, 14, 16 are co-fired together in one high temperature sintering step at a temperature of about 1430° C. in a nitrogen atmosphere. Combining the high temperature sintering steps for these three layers leads to lower manufacturing costs than can be achieved when using separate high temperature sintering steps for each of the three layers. The Cv of the tube is checked again after the sintering of the surface exchange layer to ensure no significant change has occurred.

The resultant tube has the preferred thickness, pore size and porosity within the ranges, namely, the fuel oxidation layer 12 has a thickness of from about 10 microns to about 50 micron, an average pore size of from about 0.1 micron to about 1 micron and a porosity of from about 25 percent to about 50 percent. The porous support layer 10 has a thickness of about 1.3 millimeter, an average pore size of from about 0.5 micron to about 3 micron and a porosity of from about 25 to 45 percent. The surface exchange layer 16 has a thickness of from about 10 micron to about 50 micron, an average pore size from about 0.1 micron to about 1 micron and a porosity of from about 25 percent to about 50 percent. The separation layer 14 has a thickness of from about 10 micron to about 50 micron, with substantially no connected porosity; in another embodiment with no connected porosity.

Figure 2:
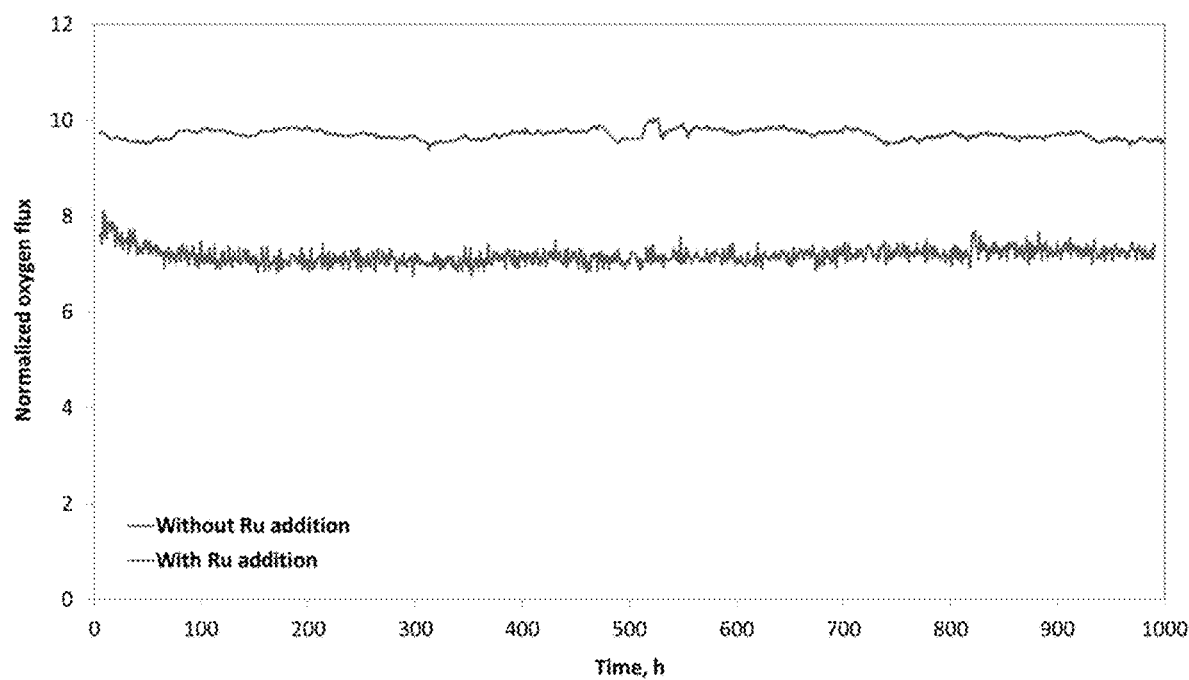
FIG. 2 is a comparison of oxygen flux between membranes with and without Ru in the fuel oxidation layer.

The oxygen flux of the tube with all three active layers and Ru catalyst in the fuel oxidation layer is tested in a single tube reactor at a high temperature for over 1000 hours. A tube with the same active layers but without catalyst addition in the fuel oxidation layer is also tested for comparison. FIG. 2 shows the normalized oxygen flux of the two tubes with and without Ru catalyst in the fuel oxidation layer. It can be appreciated that the tube with 5% Ru in the fuel oxidation layer exhibits a higher initial oxygen flux than the tube without Ru catalyst and does not show any noticeable degradation in flux over the whole testing period of time. The tube without Ru catalyst in the fuel oxidation layer shows a lower initial oxygen flux and degrades rapidly for the first 100 hours before it reaches a stable state. The higher initial flux might be attributed to the catalytical activity of the Ru metal in the fuel oxidation layer; however, it is unexpected that the addition of the Ru catalyst decreases the degradation rate as well.

Figure 3:
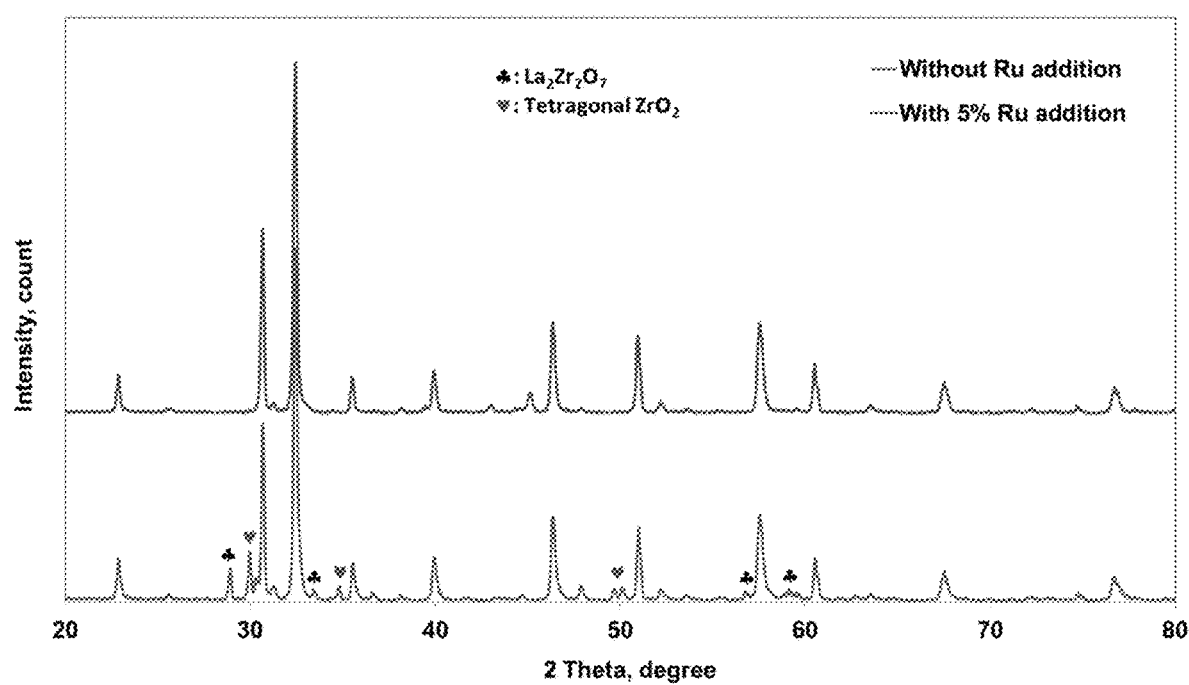
FIG. 3 is a comparison of X-ray diffraction patterns of powder mixtures of $(La_{0.8}Sr_{0.2})_{0.95}Cr_{0.5}Fe_{0.5}O_{3-\delta}$ and 10Sc1YSZ with and without Ru after exposure in reducing atmosphere at 1200° C. for 100 hours.

To further understand the reason, powder mixtures of the fuel oxidation layer with and without the addition of the Ru catalyst are examined by X-ray diffraction to check if the two phases are chemically compatible under oxygen membrane operating conditions. In this experiment, the LSCrF55 and 10Sc1YSZ, either with or without Ru addition, are intimately mixed together by ball milling. The mixed powders are compacted into pellets and then exposed in reducing atmosphere at 1200° C. for 100 hours. The powders after exposure are examined by X-ray diffraction and the results are shown in FIG. 3. From FIG. 3, it can be easily appreciated that after high temperature exposure in reducing atmosphere, without Ru in the mixture, the LSCrF55 phase reacts with the 10Sc1YSZ phase and forms $La_2Zr_2O_7$ and tetragonal $ZrO_2$ phases, as evidenced by the appearance of additional peaks in the X-ray diffraction pattern. Formation of the $La_2Zr_2O_7$ and tetragonal $ZrO_2$ phases are detrimental to the performance of oxygen transport membrane, which is well documented in the literatures in solid oxide fuel cell community and explains the initial drop of oxygen flux for the tube without Ru in the fuel oxidation layer. The powder mixture with Ru addition, however, does not show any additional peak after high temperature exposure in reducing atmosphere, which means no new phase is formed. The lower degradation of flux of the tube with Ru in the fuel oxidation layer can be explained by the improved chemical compatibility between the LSCrF55 phase and the 10Sc1YSZ phase.

Example 2

In a second example of forming the composite oxygen ion transport membrane 1, the perovskite material $(La_{0.8}Sr_{0.2})_{0.95}Cr_{0.7}Fe_{0.3}O_{3-\delta}$ (LSCrF73) for all the three active layers 12, 14 and 16, can be obtained from NexTech Materials, Ltd., Lewis Center, Ohio and $Zr_{0.802}Sc_{0.180}Y_{0.018}O_{2-\delta}$ (10Sc1YSZ) can be obtained from Daiichi Kigenso Kagaku Kogyo Co., Ltd, Osaka, Japan through their US agent Sojitz, Ltd, in New York, N.Y., USA. The perovskite powder LSCrF73 can have a particle size $d_{50}$ in the range of from about 0.3 to about 0.5 micron, the 10Sc1YSZ powder should have a $d_{50}$ of less than 0.6 micron. In order to fabricate a 70 gram batch of the gas separation layer slurry, 22.50 gram of LSCrF73 is mixed with 47.50 gram of 10Sc1YSZ, 36 gram Ferro B73210 binder, 170 gram toluene and 1200 gram of 1.5 millimeter diameter YSZ milling media in a 500 milliliter Teflon bottle. The mixture is milled until the particle size of the mixture is in the range of from about 0.3 to about 0.5 micron. The slurry was separated from the milling media and stored in a Teflon bottle. The fuel oxidation layer 12 and the surface activation layer 16 are coated from the same slurry. In order to prepare a 60 gram batch of the fuel oxidation and surface activation slurry, 16.39 gram of LSCrF73, 34.61 gram of 10Sc1YSZ, 100 gram of toluene, 20 gram of Ferro B73210 binder, and 600 gram of 1.5 millimeter diameter YSZ grinding media are added in a 250 milliliter Teflon bottle. The mixture is then milled for about 6 hours to form a slurry having a particle size $d_{50}$ of from about 0.3 to about 0.5 micron. About 9 gram of carbon black having a particle size of about $d_{50}$ of 0.8 micron and 1.2 gram of surfactant KD-1 are added to the slurry and milled for an additional 2 hours.

In order to form a composite oxygen transport membrane 1 from these slurries the slurries are deposited on a porous support 10 by slurry coating followed by firing in nitrogen. The porous support 10 can be tubular and fabricated by an extrusion process. Although the porous support 10 can be fully sintered, it can first be fired at a low temperature, for example at about 1050° C. after green forming such that some residual shrinkage remains when the coated substrate is fired again at a higher temperature. The first layer 12 is then deposited on the surface of the porous support layer 10 and the thickness is controlled by the speed at which the supporting substrate is dipped in the slurry. The first layer 12 is allowed to dry at ambient temperature. The second layer 14 is then applied on top of the first layer 12 by dipping the component into the gas separation slurry and allowed to dry. The coating process can be repeated two or more times to achieve the desired thickness. The third layer 16 is then applied on top of the second layer 14 by dipping the component into the surface activation slurry and allowed to dry. The tube coated with all three active layers is slowly heated in flowing nitrogen to a temperature of from about 1350° C. to about 1450° C. and held at the same temperature for about 6 hours to allow the membrane to sinter completely. During sintering the partial pressure of oxygen in the atmosphere of the furnace is maintained below 20 Pa. The tube is then cooled in nitrogen to complete the sintering process.

While the present invention has been described with reference to a preferred embodiment, as would occur to those skilled in the art, numerous changes, additions and omission may be made without departing from the spirit and scope of the present invention as set forth in the appended claims.

We claim:

1. A method of producing an oxygen ion composite membrane comprising:

forming a first layer on a porous support containing a first mixture of particles of $(Ln_{1-x}A_x)_wCr_{1-y}B_yO_{3-\delta}$, doped zirconia, catalyst metal M, and pore formers, where Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3, y is from about 0.1 to about 0.7, and $\delta$ is a value that renders the composition charge neutral, catalyst metal M is a catalyst metal or an oxide, carbonate or nitrate of a catalyst metal, wherein said catalyst metal is Ru:

the first mixture containing the $(Ln_{1-x}A_x)_wCr_{1-y}B_yO_{3-\delta}$, the doped zirconia and the catalyst metal M such that when sintered, the first layer will contain from about 20 vol. % to about 70 vol. % of the $(Ln_{1-x}A_x)_wCr_{1-y}B_yO_{3-\delta}$, from about 30 vol. % to about 80 vol. % of the doped zirconia, and from about 0.1 vol. % to about 20 vol. % of the catalyst metal M, based on the volume percentage of the total solid mass;

forming a second layer on the first layer that contains a second mixture of particles of $(Ln_{1-x}A_x)_wCr_{1-y}B_yO_{3-\delta}$ and the doped zirconia and that does not contain pore formers, where Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7 and $\delta$ is a value that renders the composition charge neutral;

the second mixture containing the $(Ln_{1-x}A_x)_wCr_{1-y}B_yO_{3-\delta}$ and the doped zirconia such that when sintered, the second layer will contain from about 20 vol. % to about 70 vol. % of the $(Ln_{1-x}A_x)_wCr_{1-y}B_yO_{3-\delta}$ and from about 30 vol. % to about 80 vol. % of the doped zirconia, based on the volume percentages of the total solid mass;

heating the first layer, the second layer and the porous support so that said first layer partially sinters into a porous mass containing the first mixture of particles, thereby to provide a porous fuel oxidation layer and the second layer fully sinters into a densified mass containing the second mixture of particles, thereby to provide a dense separation layer.

2. The method of claim 1, wherein:

prior to heating the first layer, the second layer and the porous support in nitrogen atmosphere a third layer is formed on the second layer containing a third mixture of particles of $(Ln_{1-x}A_x)_wCr_{1-y}B_yO_{3-\delta}$, the doped zirconia and pore formers, where Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7 and $\delta$ is a value that renders the composition charge neutral;

the third mixture having a third volume ratio of the $(Ln_{1-x}A_x)_wCr_{1-y}B_yO_{3-\delta}$ and the doped zirconia such that when sintered, the third layer will contain from about 20 vol. % to about 70 vol. % of the $(Ln_{1-x}A_x)_wCr_{1-y}B_yO_{3-\delta}$ and from about 30 vol. % to about 80 vol. % of the doped zirconia, based on the volume percentages of the total solid mass; followed by heating the first layer, the second layer, the third layer and the porous support, wherein the first layer partially sinters into a porous mass containing the first mixture of particles, thereby to provide a porous fuel oxidation layer and the second layer fully sinters into a densified mass containing the second mixture of particles, thereby to provide a dense separation layer and the third layer is heated so that said third layer partially sinters into a porous mass containing the third mixture of particles, thereby to provide a porous surface exchange layer.

3. The method of claim 2, wherein the doped zirconia is 10mol % scandia and 1 mol % yttria doped zirconia (10Sc1YSZ) or 10 mol % scandia and 1 mol % ceria doped zirconia (10Sc1CeSZ) or 10 mol % scandia and 1 mol % ceria and 1 mol % yttria doped zirconia (10Sc1Ce1YSZ10Sc1YSZ).

4. The method of claim 3, wherein:

the $(Ln_{1-x}A_x)_wCr_{1-y}B_yO_{3-\delta}$ within the first mixture of particles is $(La_{1-x}Sr_x)_wCr_{1-y}Fe_yO_{3-\delta}$, where w is 0.95, x is 0.2 and y is 0.3; the $(Ln_{1-x}A_x)_wCr_{1-y}B_yO_{3-\delta}$ within the second mixture of particles is $(La_{1-x}Sr_x)_wCr_{1-y}Fe_yO_{3-\delta}$, where w is 0.95, x is 0.2 and y is 0.3; the $(Ln_{1-x}A_x)_wCr_{1-y}B_yO_{3-\delta}$ within the third mixture of particles is $(La_{1-x}Sr_x)_wCr_{1-y}Fe_yO_{3-\delta}$, where w is 0.95, x is 0.2 and y is 0.3; and the sintered porous support is formed from doped zirconium oxide or a mixture of MgO and $MgAl_2O_4$.

5. The method of claim 4, wherein the first layer contains 20-60 vol. % of $(Ln_{1-x}A_x)_wCr_{1-y}B_yO_{3-\delta}$, 40-80 vol. % of the doped zirconia, and 1-15 vol. % of the catalyst metal M, the second layer contains 20-60 vol. % of $(Ln_{1-x}A_x)_wCr_{1-y}B_yO_{3-\delta}$ and 40-80 vol. % of the doped zirconia, the third layer contains 20-60 vol. % of $(Ln_{1-x}A_x)_wCr_{1-y}B_yO_{3-\delta}$ and 40-80 vol. % of the doped zirconia, based on the volume percentages of the total solid mass.

6. The method of claim 5, wherein the porous support is of tubular or planar configuration.

7. The method of claim 1, wherein the porous support is formed of 4YSZ and is optionally heated at a temperature ranging from about 950 to about 1200° C., so that it is not fully sintered prior to forming the first layer on the porous support; the first layer after having been formed on the porous support is dried at ambient temperature prior to coating the second layer on the first layer; and the first layer, the second layer and the porous support are heated at a temperature of from about 1350° C. to about 1450° C.

8. The method of claim 7, wherein the third layer is heated at a temperature of from about 1250° C. to about 1350° C.

9. The method of claim 2, wherein the porous support is formed of 4YSZ and is optionally heated at a temperature ranging from about 950 to about 1200° C., so that it is not fully sintered prior to forming the first layer on the porous support, wherein the first layer, the second layer, the third layer and the porous support are heated at a temperature of from about 1350° C. to about 1450° C. in an inert atmosphere, and wherein said first layer, second layer and/or said third layer are optionally formed by slurry coating.

10. The method of claim 9, wherein the doped zirconia is 10Sc1YSZ or 10Sc1CeSZ or 10Sc1Ce1YSZ.

11. The method of claim 10, wherein the porous support is 4YSZ.

12. An oxygen ion composite membrane comprising:
first and second layers on a porous support providing a porous fuel oxidation layer and a dense separation layer, respectively, for the oxygen ion composite membrane;
the first of the layers containing a mixture of $(Ln_{1-x}A_x)_w Cr_{1-y}B_y O_{3-\delta}$, doped zirconia, and catalyst metal M, where Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.6, M is Ru; the second of the layers containing a mixture of $(Ln_{1-x}A_x)_w Cr_{1-y}B_y O_{3-\delta}$ and doped zirconia, where A is Ca or Sr, and B is Fe, Mn, Co, Ni, Al, Ti or combinations thereof, w is from about 0.9 to about 1.0, x is from about 0.1 to about 0.3 and y is from about 0.1 to about 0.7;
the first of the layers containing from about 30% to about 70% of the $(Ln_{1-x}A_x)_w Cr_{1-y}B_y O_{3-\delta}$, from about 30 vol. % to about 70 vol. % of the doped zirconia, and from about 0.1 vol. % to about 20 vol. % of the catalyst metal M; and the second of the layers containing from about 30 vol. % to about 70 vol. % of the $(Ln_{1-x}A_x)_w Cr_{1-y}B_y O_{3-\delta}$ and from about 30 vol. % to about 70 vol. % of the doped zirconia, based on the volume percentages of the total solid mass.

13. The oxygen ion composite membrane of claim 12, wherein:
a third layer is situated on the second layer to form a porous surface exchange layer and that also contains the mixture of $(Ln_{1-x}A_x)_w Cr_{1-y}B_y O_{3-\delta}$ and the doped zirconia, where Ln is La, Y, Pr, Ce or Sm, A is Ca or Sr, B is Fe, Mn, Co, Ni, Al, Ti or combinations thereof, w is from about 0.9 to about 1.0, x is from about 0.1 to about 0.3 and y is from about 0.1 to about 0.7; and
the third layer containing the $(Ln_{1-x}A_x)_w Cr_{1-y}B_y O_{3-\delta}$ and the doped zirconia in a third volume percentage of $(Ln_{1-x}A_x)_w Cr_{1-y}B_y O_{3-\delta}$ of from about 20 vol. % to about 70 vol. % of the total solid mass.

14. The oxygen ion composite membrane of claim 13, wherein the doped zirconia is the doped zirconia is 10 mol % scandia and 1 mol % yttria doped zirconia (10Sc1YSZ) or 10 mol % scandia and 1 mol % ceria doped zirconia (10Sc1CeSZ) or 10 mol % scandia and 1 mol % ceria and 1 mol % yttria doped zirconia (10Sc1Ce1YSZ10Sc1YSZ).

15. The oxygen ion composite membrane of claim 14, wherein:
the $(Ln_{1-x}A_x)_w Cr_{1-y}B_y O_{3-\delta}$ within the first layer is $(La_{1-x}Sr_x)_w Cr_{1-y}Fe_y O_{3-\delta}$, where w is 0.95, x is 0.2 and y is 0.3;
the $(Ln_{1-x}A_x)_w Cr_{1-y}B_y O_{3-\delta}$ within the second layer is $(La_{1-x}Sr_x)_w Cr_{1-y}Fe_y O_{3-\delta}$, where w is 0.95, x is 0.2 and y is 0.3;
the $(Ln_{1-x}A_x)_w Cr_{1-y}B_y O_{3-\delta}$ within the third layer is $(La_{1-x}Sr_x)_w Cr_{1-y}Fe_y O_{3-\delta}$, where w is 0.95, x is 0.2 and y is 0.3; and
the sintered porous support is formed from stabilized zirconia oxide or a mixture of MgO and $MgAl_2O_4$.

16. The oxygen ion composite membrane of claim 15, wherein the first of the layers contains about 30 vol. % of $(Ln_{1-x}A_x)_w Cr_{1-y}B_y O_{3-\delta}$, about 70 vol. % of doped zirconia; the second of the layers contains about 30 vol. % of $(Ln_{1-x}A_x)_w Cr_{1-y}B_y O_{3-\delta}$ and about 70 vol. % of doped zirconia; and the third of the layers contains about 30 vol. % of $(Ln_{1-x}A_x)_w Cr_{1-y}B_y O_{3-\delta}$ and about 70 vol. % of doped zirconia, based on the volume percentages of the total solid mass.

17. The oxygen ion composite membrane of claim 16, wherein the porous support is of tubular or planar configuration and is formed from 4 mol % yttria stabilized zirconia (4YSZ).

18. The method of claim 1 wherein said heating step is conducted in a nitrogen atmosphere, air, forming gas atmosphere, $CO_2$, argon, or mixtures thereof.

* * * * *